UNITED STATES PATENT OFFICE.

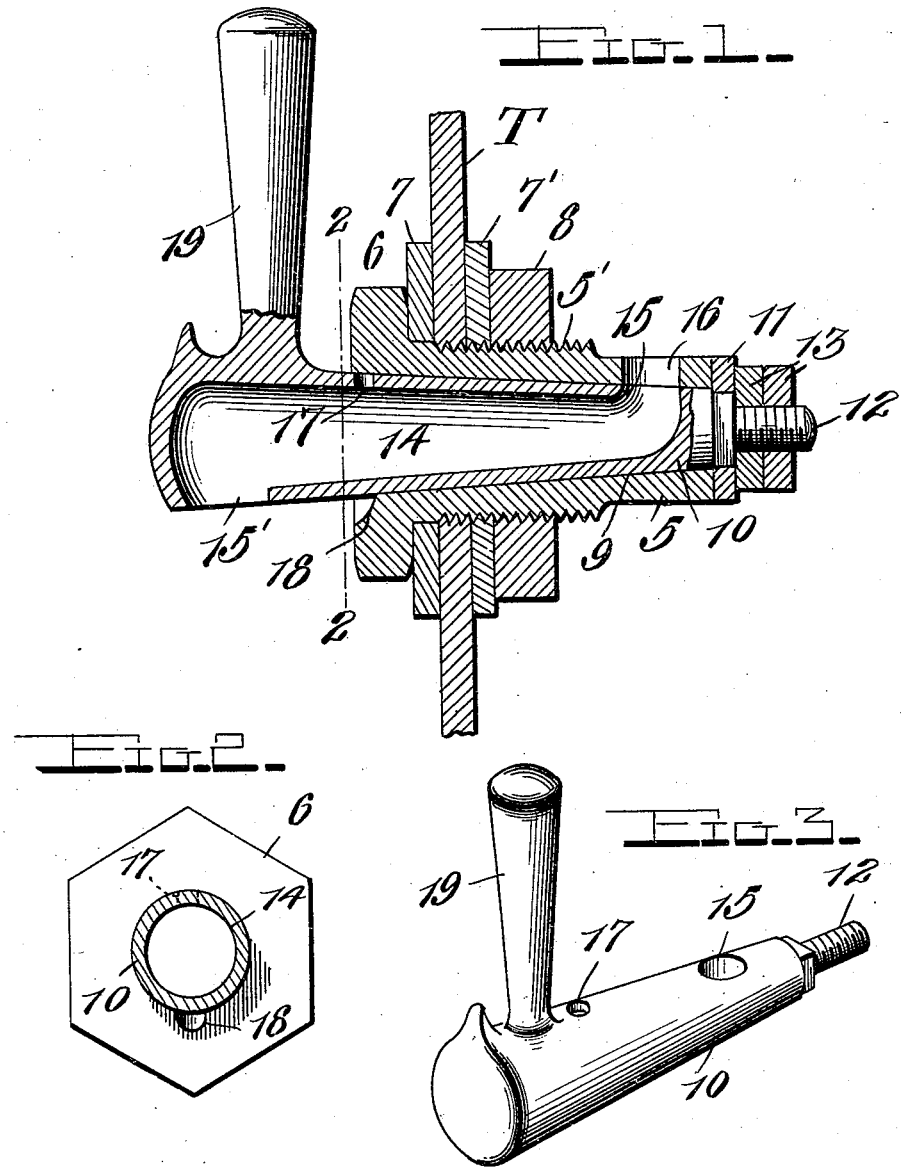

WOODSON L. SPARROW, OF MURPHYSBORO, ILLINOIS.

FAUCET.

988,040.  Specification of Letters Patent.  Patented Mar. 28, 1911.

Application filed October 12, 1910. Serial No. 586,740.

*To all whom it may concern:*

Be it known that I, WOODSON L. SPARROW, a citizen of the United States, residing at Murphysboro, in the county of Jackson and State of Illinois, have invented certain new and useful Improvements in Faucets, of which the following is a specification, reference being had to the accompanying drawings.

This invention relates to improvements in faucets for barrels, tanks or other liquid containers and has for its object to provide a simple, inexpensive and durable device of this character whereby the liquid remaining in the bore of the plug of the faucet may be drained off after the faucet is closed.

A further object of the invention resides in the provision of a faucet having a casing and a plug rotatably arranged therein, said plug having a bore extending at its ends through opposite sides of the plug, the inner end of the bore being adapted to coincide with an opening in the casing when the faucet is open, and an opening in said plug alined with the inner end of the bore closed by the valve casing when the faucet is open, said casing having a cut out portion with which said opening in the plug is adapted to register to drain the excess water remaining in the bore of the plug after the faucet is closed.

With these and other objects in view, the invention consists of the novel features of construction, combination and arrangement of parts hereinafter fully described and claimed, and illustrated in the accompanying drawings, in which—

Figure 1 is a longitudinal section of a faucet constructed in accordance with my invention; Fig. 2 is a section taken on the line 2—2 of Fig. 1; and Fig. 3 is a detail perspective view of the faucet plug.

Referring more particularly to the drawing 5 designates a cylindrical casing a portion of which is exteriorly threaded as shown at 5', said casing being formed on one end with a head 6. This head is adapted to closely engage with a gasket 7 arranged between the outer surface of the tank sheet T and said head, the faucet casing extending through an opening in the tank sheet. Another gasket 7' is arranged upon the casing 5 and engages the inner surface of the tank. A nut 8 is then threaded upon the threaded portion 5' of the casing to engage the gasket 7'. In this manner a water-tight connection between the faucet and the tank is effected.

The casing 5 of the faucet is provided with a longitudinally tapering opening 9 to receive the plug or valve 10. This plug is also longitudinally tapered and at its smaller end is formed with a squared portion to receive a collar 11. Beyond the squared portion of the plug the same is formed with a threaded stem 12 upon which the lock nuts 13 are adapted to be threaded into binding engagement with the face of the collar 11. The plug or valve 10 is provided with a longitudinal bore 14 the ends of said bore opening through opposite sides of the plug as shown at 15 and 15' respectively. The inner end 15 of the bore is adapted to register with an opening 16 provided in one side of the casing 5 to permit of a free flow of the water through the bore of the plug to the outlet opening 15' thereof. A small opening 17 is also formed in one side of the rotary plug 14 in longitudinal alinement with the inner opening 15 of the bore of said plug. This small opening when the faucet is open is disposed as indicated in Fig. 1, within the plane of the face of the head 6 of the faucet casing. This head is formed in its outer face at the end of the opening 9 of the casing with a recess or notch 18 with which the opening 17 is adapted to register when the flow of water or other fluid is cut off.

Upon the outer end of the plug or valve 10 a suitable handle 19 is formed whereby said plug may be conveniently rotated. When this handle is disposed downwardly communication is cut off between the inner end of the bore 14 of the plug and the opening 16 in the valve casing and the outlet opening 15' of the bore is disposed upwardly. The water which may remain in the bore of the plug when the flow is cut off is drained therefrom through the opening 17 which as before stated registers with a notch or recess 18 in the head of the casing 5. Thus corrosion of the metal by allowing the water to remain therein and which would have a deleterious effect upon the liquid is eliminated.

From the foregoing it will be seen that I have devised a very simple and novel form of faucet whereby the water may be completely drained therefrom upon cutting off the flow. The device is extremely simple, may be easily and quickly attached to the tank or other container and is highly efficient and very durable in practical use.

While I have shown and described the preferred construction and arrangement of the various parts, it will be understood that the device is susceptible of considerable modification without departing from the essential feature or sacrificing any of the advantages of the invention.

Having thus described the invention what is claimed is:—

In a faucet, the combination of a casing adapted to be arranged in the wall of a container, said casing having a longitudinally tapered opening, a rotary plug arranged in the opening of said casing having a longitudinal bore, the ends of said bore extending through opposite sides of the plug, said casing having a radial opening communicating with the inner end of the bore when the faucet is open, said faucet casing having a head formed on its outer end, a handle formed on the outer end of the plug, said plug having an opening therein adjacent to the handle disposed in longitudinal alinement with the inner open end of the bore, the head of the valve casing having a recess therein at the outer end of the longitudinal opening of the casing, the opening in the outer end of the plug being adapted to register with the recess in the head of the casing when the flow of water is cut off by the rotary movement of the plug whereby the water remaining in the bore of the plug is drained therefrom.

In testimony whereof I hereunto affix my signature in the presence of two witnesses.

WOODSON L. SPARROW.

Witnesses:
J. H. KANE,
GEORGE P. MCCORKEY.

---

Copies of this patent may be obtained for five cents each, by addressing the "Commissioner of Patents, Washington, D. C."